(12) United States Patent
Kang et al.

(10) Patent No.: US 10,336,039 B2
(45) Date of Patent: Jul. 2, 2019

(54) RESIN-COMPATIBLE LAMINATE STRUCTURES

(71) Applicant: E I DU PONT DE NEMOURS AND COMPANY, Wilmington, DE (US)

(72) Inventors: Byoung Sam Kang, Midlothian, VA (US); Sang Woo Lee, Seoul (KR)

(73) Assignee: EI DU PONT DE NEMOURS AND COMPANY, Wilmington, DE (US)

( * ) Notice: Subject to any disclaimer, the term of this patent is extended or adjusted under 35 U.S.C. 154(b) by 121 days.

(21) Appl. No.: 15/490,141

(22) Filed: Apr. 18, 2017

(65) Prior Publication Data

US 2017/0320298 A1 Nov. 9, 2017

Related U.S. Application Data

(60) Provisional application No. 62/331,561, filed on May 4, 2016.

(51) Int. Cl.
| | |
|---|---|
| *H01B 17/60* | (2006.01) |
| *B32B 19/06* | (2006.01) |
| *B32B 5/02* | (2006.01) |
| *B32B 5/12* | (2006.01) |
| *B32B 5/16* | (2006.01) |
| *B32B 5/22* | (2006.01) |
| *B32B 5/24* | (2006.01) |
| *B32B 5/30* | (2006.01) |
| *B32B 7/12* | (2006.01) |
| *B32B 19/02* | (2006.01) |

(52) U.S. Cl.
CPC .............. *B32B 19/06* (2013.01); *B32B 5/024* (2013.01); *B32B 5/12* (2013.01); *B32B 5/16* (2013.01); *B32B 5/22* (2013.01); *B32B 5/24* (2013.01); *B32B 5/30* (2013.01); *B32B 7/12* (2013.01); *B32B 19/02* (2013.01); *B32B 2250/40* (2013.01); *B32B 2262/0269* (2013.01); *B32B 2262/101* (2013.01); *B32B 2307/206* (2013.01); *B32B 2457/04* (2013.01); *H01B 17/60* (2013.01)

(58) Field of Classification Search
CPC .......... H01B 3/04; H01B 17/60; H01B 17/66; B32B 5/024; B32B 5/12; B32B 7/12; B32B 19/02; B32B 19/06; B32B 2260/046; B32B 2262/0215; B32B 2262/101; B32B 2307/206

See application file for complete search history.

(56) References Cited

U.S. PATENT DOCUMENTS

| | | | |
|---|---|---|---|
| 2,420,172 A | 5/1947 | Griffeth et al. | |
| 2,988,782 A | 6/1961 | Parrish et al. | |
| 2,999,788 A | 9/1961 | Morgan | |
| 3,063,966 A | 11/1962 | Kwolek et al. | |
| 3,227,793 A | 1/1966 | Cipriani | |
| 3,287,324 A | 11/1966 | Sweeney | |
| 3,414,645 A | 12/1968 | Morgan | |
| 3,523,061 A * | 8/1970 | Purvis | H01B 3/04 162/108 |
| 3,767,756 A | 10/1973 | Blades | |
| 3,811,005 A * | 5/1974 | Trunzo | H01B 3/002 174/121 SR |
| 3,869,429 A | 3/1975 | Blades | |
| 3,869,430 A | 3/1975 | Blades | |
| 5,667,743 A | 9/1997 | Tai et al. | |
| 6,153,301 A * | 11/2000 | Iwata | H01B 3/04 310/179 |
| 6,312,561 B1 | 11/2001 | Forsten et al. | |
| 6,991,845 B2 | 1/2006 | Levit et al. | |
| 7,399,379 B2 | 7/2008 | Levit et al. | |
| 2003/0219581 A1* | 11/2003 | Flynn | H01B 3/006 428/299.4 |
| 2006/0019081 A1* | 1/2006 | Levit | B32B 7/02 428/292.1 |

FOREIGN PATENT DOCUMENTS

| | | |
|---|---|---|
| CH | 396118 A | 7/1965 |
| CN | 105155328 A | 12/2015 |
| DE | 19640964 A1 | 4/1998 |
| EP | 0915484 A1 | 5/1999 |
| WO | WO-9814959 A1 * | 4/1998 ............... H01B 3/04 |

OTHER PUBLICATIONS

English translation to WO 98/14959 to Lutz et al. obtained from EPO website. (Year: 1998).*
International Search Report, dated Jul. 27, 2017, for International Application No. PCT/US2017/030348, filed May 1, 2017, European Patent Office.

* cited by examiner

Primary Examiner — Jeremy R Pierce

(57) ABSTRACT

This invention pertains to a laminate structure suitable for use as electrical insulation, comprising a first paper layer comprising 90 to 99 weight percent uniformly distributed calcined mica and 1 to 10 weight percent supporting material, a majority by weight of the supporting material being in the form of a floc; and a support layer comprising unidirectional filaments or unidirectional yarns or woven yarns; wherein the support layer is bound to the first paper layer; the laminate structure having a dielectric strength of 15 kV/mm or greater, a Gurley porosity of 400 seconds or less, and total mica content of 60 weight percent or greater. The laminate structure can further comprise a second paper layer bound to the support layer, the second paper layer comprising 90 to 99 weight percent uniformly distributed calcined mica and 1 to 10 weight percent supporting material, a majority by weight of the supporting material being in the form of a floc.

14 Claims, No Drawings

RESIN-COMPATIBLE LAMINATE STRUCTURES

BACKGROUND OF THE INVENTION

Field of the Invention

The present invention relates to a laminate structure suitable for use as electrical insulation in such things as motors, generators, and inverters.

Description of the Related Art

To those skilled in the art, the term "mica paper" refers to sheet made with high concentrations of the inorganic mineral mica, generally in an amount that is at least 90 weight percent or greater, with the remainder being a binder that provides some mechanical integrity to paper. However, the resulting mica paper is not a mechanically strong paper.

U.S. Pat. Nos. 6,991,845 and 7,399,379 to Levit et al. discloses a sheet structure for electrical insulation or flame resistance comprising a barrier ply having a mica-rich face and a mica-poor face and a reinforcing ply containing a saturable backing layer attached to the mica-poor face of the barrier ply.

U.S. Pat. No. 6,991,845 to Levit et al. and U.S. Pat. No. 6,312,561 to Forsten et al. disclose an aramid-mica blended paper made from a homogenous blend of m-aramid fiber, m-aramid fibrids, and mica. Levit et al. further teaches that this "aramid-mica paper" has superior mechanical properties when compared to "mica paper" and can be used without any backing reinforcement.

In some instances, the use of "calcined" mica in sheet structures utilized in the high voltage electrical insulation market is desirable because the calcined mica has improved dieletric properties over "uncalcined" mica. Calcination provides smaller-sized mica platelets when compared to natural or uncalcinated mica flakes, which is believed to improve the dielectric performance of the mica in the sheet. Unfortunately these smaller-sized mica platelets also form a less porous layer, meaning the layer can be difficult to wet out with impregnating matrix resins.

Therefore what is needed are improved methods to make laminate structures containing calcined mica having improved porosity.

SUMMARY OF THE INVENTION

This invention relates to a laminate structure suitable for use as electrical insulation, comprising:
a) a first paper layer comprising 90 to 99 weight percent uniformly distributed calcined mica and 1 to 10 weight percent supporting material, a majority by weight of the supporting material being in the form of a floc; and
b) a support layer comprising unidirectional filaments or unidirectional yarns or woven yarns, the support layer having a first and second face;
wherein the first face of the support layer is directly bound to a face of the first paper layer;
the laminate structure having a dielectric strength of 15 kV/mm or greater, a Gurley porosity of 400 seconds or less, and a total mica content of 60 weight percent or greater.

This invention also relates to a laminate structure suitable for use as electrical insulation, comprising:
a) a first paper layer comprising 90 to 99 weight percent uniformly distributed calcined mica and 1 to 10 weight percent supporting material, a majority by weight of the supporting material being in the form of a floc;
b) a support layer comprising unidirectional or woven filament yarns, the support layer having a first and second face; and
c) a second paper layer comprising 90 to 99 weight percent uniformly distributed calcined mica and 1 to 10 weight percent supporting material, a majority by weight of the supporting material being in the form of an floc;
wherein the first face of the support layer is directly bound to a face of the first paper layer and the second face of the support layer is directly bound to a face of the second paper layer; and
the laminate structure having a total mica content of 60 weight percent or greater. Preferably, the laminate structure has a dielectric strength of 15 kV/mm or greater and a Gurley porosity of 400 seconds or less.

DETAILED DESCRIPTION

This invention relates to a laminate structure having the combination of surprising high porosity and high dielectric properties, the laminate structure comprising at least a first paper layer, containing calcined mica and supporting material, and a support layer. A face of the first paper layer is directly and uniformly bound to a face of the support layer. By directly and uniformly bound it is meant the two layers are essentially in contact with each other, with the proviso the phrase "in contact" is understood to include, but is not limited to, an adhesive being used to attach the two layers together.

This invention also relates to a multilayer laminate structure comprising at least a first paper layer and a second paper layer, each containing calcined mica and supporting material, with a support layer positioned between and attached to the two layers of paper.

"Calcined mica" as used herein means mica such as muscovite or phlogopite mica, or blends thereof, that is obtained by heating natural mica to a high temperature (usually greater than 800° C., sometimes more than 950° C.). This treatment removes water and impurities and improves the temperature resistance of the mica. Calcined mica is normally used in the form of a flake particle and mica of the muscovite type is preferred. Calcined mica has improved dieletric properties and corona resistance over natural or uncalcined mica. Calcination provides smaller-sized mica platelets when compared to natural or uncalcinated mica flakes. Unfortunately these smaller-sized mica platelets also form a less porous layer, meaning the layer can be difficult to wet out with impregnating matrix resins. The porosity of the layer or laminate structure is evidenced by measuring the Gurley Porosity of the layer or laminate structure, which measures the time in seconds it takes to pass a certain volume of air through a certain area of material at a certain pressure differential. Higher values, that is, longer times, mean a less porous structure. Smaller values indicate a more porous structure.

"Uncalcined mica" as used herein means mica such as muscovite or phlogopite mica that is essentially in pure natural form that has preferably been homogenized and purified to remove imperfections and impurities. Uncalcined mica can form a very porous mica layer due to the larger size of the natural mica flakes. It is easily wetted and impregnated by a matrix resin. Unfortunately, the uncancined mica has a lower dielectric strength than the calcined mica.

The first paper layer used in the laminate structure comprises 90 to 99 weight percent uniformly distributed calcined mica and 1 to 10 weight percent supporting material, based on the total amount of calcined mica and supporting material in the layer. In some preferred embodiments, the first paper layer comprises 95 to 99 percent uniformly distributed calcined mica and 1 to 5 weight percent supporting material, based on the total amount of calcined mica and supporting material in the layer. By uniformly distributed, it is meant the mica can be homogenously distributed throughout the paper layer, or the mica can be uniformly areally distributed throughout a concentrated planar zone in the paper that is closer to one of the faces of the layer. Implicit in this definition is the mica is sufficiently distributed to provide the desired electrical performance of the final laminate structure.

In the first paper layer, while there is only a small amount of supporting material present, a majority by weight of that supporting material is in the form of a floc. It has been found that when a majority by weight (that is, greater than 50% by weight) of the supporting material is a floc, the resulting paper layer has surprisingly good porosity despite the tremendous amount of calcined mica being present (90 to 99 wt %). Preferably, floc is present in the supporting material of the first paper layer in an amount of 60 weight percent or greater, based on the total amount of the supporting material in the paper layer. In another embodiment, the floc is present in the supporting material of the first paper layer in an amount of 80 weight percent or greater, based on the total amount of the supporting material in the paper layer. In some embodiments the floc is aramid, cellulose, acetate, acrylic, polyolefin, polyamide, polyester, glass, rock wool, polycrystal like alumina, monocrystal like potassium titanate, or mixtures thereof.

In one embodiment, the supporting material in the first paper layer comprises greater than 50 weight percent to 65 weight percent floc, based on the total amount of floc in the supporting material in the layer. In another embodiment, the supporting material in the first paper layer comprises 65 to 80 weight percent floc, based on the total amount of floc in the supporting material in the layer. In some preferred embodiments, the supporting material in the first paper layer comprises 1 to 20 weight percent binder and 80-99 weight percent floc, based on the amounts of binder and floc in the supporting material in the layer.

The supporting material contains a majority of floc, and the remaining supporting material can be one or more binders. The binder can be one or more types of binder, and while the binder(s) can be any chemical or treatment or additive known in the art to bind floc or fibrous material to form a paper, in one preferred embodiment the binder is a binder particle, preferably a particle having a filmy structure. The preferred binder particle is a fibrid, and the preferred fibrid is an aramid fibrid. In one preferred embodiment, the supporting material in the first paper layer consists only of aramid binder in the form of aramid fibrids, and aramid floc. The preferred aramid for the binder, fibrids, and floc includes poly(meta-phenylene isophthalamide).

The first paper layer by itself preferably has a basis weight of 50 grams per square meter or greater. In some embodiments a basis weight of 100 grams per square meter or greater is preferred. From a practical standpoint the layer has a maximum basis weight of 150 grams per square meter. In a preferred embodiment the first paper layer by itself has a Gurley Porosity of 350 seconds or lower. Preferably the first paper layer by itself has a Gurley Porosity of 300 seconds or lower. In the laminate structure, the first paper layer is directly bound to a support layer.

The support layer provides mechanical integrity to the laminate structure. The support layer comprises unidirectional filaments or unidirectional yarns, or woven yarns, and has a first face for binding the support layer directly to a face of the first paper layer and an opposing second face for potential binding directly to a face of an optional second paper layer. In one preferred embodiment, the filaments or fibers of the support layer comprise glass filaments or fibers.

Useful filaments and fibers for the support layer can range from 10 to 50 micrometers. Useful basis weights for the support layer can range from 10 to 30 grams per square meter.

It is believed the version of the support layer that is the most useful for many tape applications is a unidirectional warp of filaments or filament yarns. This allows the support layer to contribute a minimum amount of weight and thickness to the laminate structure. This is important in that the materials of the support layer generally do not have the dielectric performance of the mica paper layer(s).

The laminate structure is suitable for use as electrical insulation and comprises a first paper layer, containing calcined mica and supporting materials, and a support layer. The support layer has a first and second face, and the first face of the support layer is directly bound to a face of the first paper layer.

Specifically, in one embodiment, the laminate structure suitable for use as electrical insulation comprises
  a) a first paper layer comprising 90 to 99 weight percent uniformly distributed calcined mica and 1 to 10 weight percent supporting material, a majority by weight of the supporting material being in the form of a floc; and
  b) a support layer comprising unidirectional filaments or unidirectional yarns or woven yarns, the support layer having a first and second face;
wherein the first face of the support layer is directly bound to a face of the first paper layer; the laminate structure having a dielectric strength of 15 kV/mm or greater, a Gurley porosity of 400 seconds or less, and total mica content of 60 weight percent or greater. This embodiment is also referred to herein as the two-layer embodiment.

In one embodiment the first paper layer is bound to the support layer by use of an adhesive. Useful adhesives include but are not limited to adhesives based on such things as polyurethanes, epoxies, polyimides, phenolics, melamines, alkyds, polyesters, polyesterimides, benzoxazines, silicones and combinations thereof.

The laminate structure surprisingly has the desired combination of a high dielectric strength, of 15 kV/mm of laminate structure thickness or greater, due to the use of calcined mica; and low Gurley porosity of 400 seconds or less, due to the majority by weight of the supporting material in the paper layer being present as a floc. In some embodiments the dielectric strength is more than 17.5 kV per millimeter of laminate structure thickness, preferably more than 20 kV per millimeter of laminate structure thickness. Dielectric strength is a meaningful value to compare the dielectric breakdown voltage of materials having different thicknesses. The dielectric breakdown voltage or electric breakdown voltage is the potential difference at which dielectric failure occurs under prescribed conditions, in an electrical insulating material located between two electrodes.

The laminate structure can further comprise an impregnating resin, varnish, or mixture thereof, also referred to collectively herein as a matrix resin. In one preferred embodiment, the resin, varnish, or mixture thereof is partially or completely cured in the laminate structure. Generally the laminate structure or tape is first applied to the conductor and then the entire structure impregnated; however, there may be some instances where the laminate structure is pre-impregnated with a resin prior to use as insulation.

Lower measured values in Gurley porosity of the entire laminate structure are desireable. These laminate structures are more porous than laminate structures with higher measured values in Gurley porosity; this means the laminate structure can be quickly impregnated with a matrix resin, such as when used in an electrical part or main wall insulation in motors and generators. This is especially important when the laminate structure undergoes vacuum impregnation to form the electrical part or wall insulation. While the laminate structure has a Gurley porosity of 400 seconds or less, preferably the laminate structure has a Gurley porosity of 375 seconds or less.

In some preferred embodiments the laminate structure is used as electrical insulation in the form of a tape. As used herein the word tape means a relatively narrow-width strip of laminate structure, the tape having preferably a width of approximately 0.635 to 5.1 centimeters (0.25 to 2 inches). In some embodiments the width is from 0.635 to 2.54 centimeters (0.25 to 1 inches). In some embodiments the width is preferably 10 to 25 millimeters (1 to 2.5 cm or 0.39 to 1.0 inches). These laminate structure tapes are generally made by precise slitting of larger-width sheets or rolls of the laminate structure.

The laminate structure has a total mica content of 60 weight percent or greater, based on the amount of mica and the total weight of the laminate structure without any impregnating matrix resin. It is believed this total amount of mica is needed in the laminate structure to provide adequate electrical insulation performance. In some embodiments the total mica content of the total laminate structure is 75 weight percent or greater, based on the amount of mica and the total weight of the laminate structure without any matrix resin.

In some embodiments the support layer makes up only 5 to 30 weight percent of the composition of the total laminate structure without matrix resin. In some other embodiments the support layer makes up 10 to 20 weight percent of the composition of the total laminate structure without matrix resin. Further, in some embodiments the adhesive can be present in the laminate structure in an amount of 0 to 8 weight percent of the total laminate structure without matrix resin, and in some embodiments the adhesive is 4 to 8 weight percent of the total laminate structure without matrix resin. In some other embodiments the amount of adhesive is 0 to 3 weight percent of the total laminate structure without matrix resin. If used, the adhesive can preferably be applied in amounts of up to about 9 g/m$^2$.

In some embodiments, the basis weight of the total laminate structure is about 70 g/m$^2$ to as much as 300 g/m$^2$; however in some preferred embodiments the basis weight is from about 100 g/m$^2$ to 225 g/m$^2$. Other specific perferred properties of the total laminate structure include a total thickness ranging from 0.10 to 1.0 mm.

In addition, it is preferred that the laminate structure have adequate mechanical strength to be wrapped around a conductor with automated mechanical wrapping machines. This can be expressed as minimum tensile strength for a paper or a tape. In some embodiments the minimum tensile strength for a wrappable tape is 20 Newtons per centimeter of width. A preferred tensile strength of the laminate structure is 70 N/cm or greater, preferably 100 N/cm. Further, for useful wrapping of conductors with tapes of the multilayer laminate structure, the laminate structure should preferably have a flexibility or stiffness of less than about 100 N/m, preferably less than about 50 N/m for use in high-speed machine tape-wrapping processes.

Motors, inverters, generators, and other electrical devices can contain a number of winding wires or conductors individually insulated to prevent one wire or conductor from coming in contact with another. In many cases these insulated winding wires or conductors are rectangular in cross section to ensure a dense uniform packing of the motor windings, but conductors of any cross sectional shape can be used. The words conductor and wire are used interchangeably herein.

In some embodiments the laminate structure is applied by spirally-wrapping narrow tapes of the laminate structure around a conductor to form overlapping layers. In some instances this can allow routes for a varnish resin or a matrix resin to penetrate and be present between the layers of the insulation. As used herein, "spirally wrapped" is meant to include spiral or helical wrapping of one or more tapes around the outer circumference of the conductor.

Since the overall thickness of the insulation on any one conductor can be made up of single wraps of tape or multiple overlapping tapes, in some embodiments the overall density of the sheath of electrical insulation on the conductor is from about 0.2 to 0.6 grams per cubic centimeter, preferably about 0.3 to 0.5 grams per cubic centimeter. In some embodiments the overall thickness of the insulation on any one conductor can be 0.635 to 1.3 millimeters (0.025 to 0.05 inches). An insulation thickness of less than about 0.635 millimeters (mm) is believed to provide too little amount of insulation material to provide sufficient dielectric strength. A thickness of more than about 1.3 mm (0.05 inches) is believed to be impractical for many electrical devices. Since the overall thickness or "build" of the insulation can be an important parameter, the actual number of layers of tape that is overlapped can vary, with the insulation having the thickness of 1 or 2 layers of the laminate structure to as much as 10 to even 100 layers or more layers of the laminate structure being possible.

In another embodiment, the laminate structure suitable for use as electrical insulation comprises,
  a) a first paper layer comprising 90 to 99 weight percent uniformly distributed calcined mica and 1 to 10 weight percent supporting material, a majority by weight of the supporting material being in the form of a floc;
  b) a support layer comprising unidirectional or woven filament yarns, the support layer having a first and second face; and
  c) a second paper layer comprising 90 to 99 weight percent uniformly distributed calcined mica and 1 to 10 weight percent supporting material, a majority by weight of the supporting material being in the form of a floc;
wherein the first face of the support layer is directly bound to a face of the first paper layer and the second face of the support layer is directly bound to a face of the second paper layer; and the laminate structure having a total mica content of 60 weight percent or greater. In other words, in this embodiment the support layer is sandwiched between a first paper layer and a second paper layer, and directly bound to both layers. Preferably the laminate structure of this embodiment has a dielectric strength of 15 kV/mm or greater and a Gurley porosity of 400 seconds or less. This embodiment is also referred to herein as the three-layer embodiment.

In this embodiment, the first and second paper layers can have the same composition, if desired, or the compositions can vary as long as they fit within the ranges stated herein.

Specifically, the floc in both the first and the second paper layer can be present in an amount of 60 weight percent or greater, based on the total amount of the supporting material in the respective paper layer; or the floc in both the first and the second paper layer can be present in an amount of 80 weight percent or greater, based on the total amount of the supporting material in the respective paper layer. The other ranges of attributes, features, and preferences of the second paper layer are the same as the first paper layer described herein. The methods in which the first paper layer is bound to the support layer as previously described herein, including the adhesives, also apply to the binding of the second paper layer to the support layer. In some embodiments the second paper layer is the same as the first paper layer. In addition, preferably the properties of this three-layer embodiment of the laminate structure are described by or fall within the range of property values discloses herein for the two-layer embodiment.

The term floc, as used herein, means fibers having a short length and that are customarily used in the preparation of wet-laid sheets and/or papers Typically, floc has a length of from about 3 to about 20 millimeters. A preferred length is from about 3 to about 7 millimeters. Floc is normally produced by cutting continuous fibers into the required lengths using well-known methods in the art.

The term aramid, as used herein, means aromatic polyamide, wherein at least 85% of the amide (—CONH—) linkages are attached directly to two aromatic rings. Optionally, additives can be used with the aramid and may be dispersed throughout the polymer structure. It has been found that up to as much as about 10 percent by weight of other supporting material can be blended with the aramid. It has also been found that copolymers can be used having as much as about 10 percent of other diamines substituted for the diamine of the aramid or as much as about 10 percent of other diacid chlorides substituted for the diacid chloride of the aramid.

The preferred aramid is a meta-aramid. The aramid polymer is considered a meta-aramid when the two rings or radicals are meta oriented with respect to each other along the molecular chain. The preferred meta-aramid is poly (meta-phenylene isophthalamide)(MPD-I). U.S. Pat. Nos. 3,063,966; 3,227,793; 3,287,324; 3,414,645; and 5,667,743 are illustrative of useful methods for making aramid fibers that could be used to make aramid floc.

Alternatively, the aramid floc could be a para-aramid or an aramid copolymer. The aramid polymer is considered a para-aramid when the two rings or radicals are para oriented with respect to each other along the molecular chain. Methods for making para-aramid fibers are generally disclosed in, for example, U.S. Pat. Nos. 3,869,430; 3,869,429; and 3,767,756. One preferred para-aramid is poly(paraphenylene terephthalamide); and one preferred para-aramid copolymer is copoly(p-phenylene/3,4'diphenyl ester terephthalamide). The preferred aramid floc is a meta-aramid floc, and especially preferred is floc made from the meta-aramid poly(meta-phenylene isophthalamide)(MPD-I).

The term fibrids, as used herein, means very small, nongranular, fibrous or film-like particles with at least one of their three dimensions being of minor magnitude relative to the largest dimension. These particles are prepared by precipitation of a solution of supporting material using a non-solvent under high shear, as disclosed for example in U.S. Pat. Nos. 2,988,782 and 2,999,788. Aramid fibrids are non-granular film-like particles of aromatic polyamide having a melting point or decomposition point above 320° C. The preferred aramid fibrid is a meta-aramid fibrid, and especially preferred are fibrids made from the meta-aramid poly(meta-phenylene isophthalamide) (MPD-I).

Fibrids generally have a largest dimension length in the range of about 0.1 mm to about 1 mm with a length-to-width aspect ratio of about 5:1 to about 10:1. The thickness dimension is on the order of a fraction of a micron, for example, about 0.1 microns to about 1.0 micron. While not required, it is preferred to incorporate aramid fibrids into the layers while the fibrids are in a never-dried state.

The term layer, as used in the first paper layer and the second paper layer, preferably refers to a thin planar material of a specific composition. The term layer also refers to a paper made from a plurality of thin planar webs attached together wherein all the planar webs have the same composition. The term face refers to either of the two major surfaces of the paper layer, or either of the two major surfaces of the support layer (i.e., one side or the other of the paper layer or support layer).

In some embodiments, an individual paper layer containing calcined mica and supporting materials has a thickness of 0.5 millimeters or less. In some other embodiments, an individual paper layer has a thickness of 0.25 millimeters or less. In one preferred embodiment an individual paper layer has a thickness of 0.13 millimeters or less; in other preferred embodiments an individual paper layer has a thickness of 0.1 millimeters or less. Further, it is believed that an individual paper layer should have a thickness of at least 0.06 millimeters to provide adequate mica to the laminate structure.

In the two-layer embodiment, the first paper layer can be directly bound to the support layer by use of a continuous or discontinuous layer of adhesive. In the three-layer embodiment, the first paper layer and the second paper layer can be bound to the support layer by use of a continuous or discontinuous layer of adhesive. In one practice of this three-layer embodiment, each of the layers are made separately and then combined with a layer of adhesive provided in between, with the layers being, in order, the first paper layer, the support layer, and then the second paper layer. In all of the embodiments, each of the first paper layer and the second paper layer can be made separately on a papermaking machine by providing and aqueous dispersion of the desired amount and proportion of mica and supporting material to the headbox and then wet-laying the composition as a web onto a papermaking wire. The wet web can then be dried on dryer drums to form a paper. Preferably the paper is then further calendered in the nip of a hot roll calender under pressure and heat, or by other means, to consolidate and densify the paper into a paper layer having the desired thickness. If desired, two or more lighter basis weight or thinner wet webs or papers of the same composition can be made separately and then calendered and consolidated together into a single paper layer. In a preferred embodiment each of paper layer is calendered separately prior to being combined with the support layer in the laminate structure.

In one preferred embodiment, to homogeneous and continuously bind a face of the each of a paper layer to a face of the support layer, a liquid adhesive is applied to at least one face of a layer in a relatively uniform manner. The adhesive can be applied to either a paper layer or the support layer using any method that provides a uniform continuous application of adhesive to one side of the layer without gaps; such methods include those that involve roll coating or blade coating or spray coating. Preferably the adhesive is applied to a uniform thickness, and the adhesive is continuous in the laminate structure. Alternatively, the adhesive can be provided in a solid sheet form inserted between each of the mica-containing layers and the support layer. The layers and adhesive are then pressed together, with the adhesive positioned in between the layers, using any method that can press or consolidate the layers together. Such methods could include nipping the layers (with adhesive between) in the nip(s) of a set of calender rolls. This consolidates the layers into a laminate structure having the desired thickness and fully and directly binds the layers together. If needed, the adhesive can be additionally cured using heat applied before, after, or while the layers are pressed under pressure.

In some preferred embodiments, the final laminate structure consists essentially of, or only of, (1) the first paper layer attached to the support layer plus the optional adhesive positioned between the those layers; or (2) the first paper layer attached to the support layer which is in turn attached to the second paper layer plus the optional adhesive positioned between each of those layers.

In some embodiments, the laminate structure in sheet form is slit into a tape that can in turn be impregnated with resin, using several possible methods. One common method comprises impregnating the laminate structure in the form of a tape with resin after it has been inserted into, or wound around, the item to be insulated. The resin is then cured. A second common method comprises impregnating the laminate structure in the form of a tape with resin prior to it being inserted into or wound around the item to be insulated, and then curing the resin.

While the laminate structure is believed to have immediate use in industrial motors, wind turbine generators, other uses and applications are possible, including but not limited to such things as traction motors, turbo and hydro generators, and industrial power inverters.

Test Methods

The following test methods were used in the Examples provided below.

Basis Weight was measured according to ASTM D 645 and ASTM D 645-M-96 and reported in $g/m^2$.

Thickness was measured according to ASTM D 646-96 and reported in mm.

Tensile Strength was measured according to ASTM D 828-93 with 2.54 cm wide test specimens and a gage length of 18 cm and reported in N/cm.

Gurley Porosity was measured by air resistance in seconds per 100 mililiters of cylinder displacement for approximately 6.4 square centimeters circular area of a paper using a pressure differential of 1.22 kPa in accordance with TAPPI T460.

Stiffness (flexibility) or the bending resistance is the maximum flexural load to bend a specimen divided by the length of test speicimen (15 mm wide by 200 mm long) in accordance with IEC 60371-2 and reported in N/m.

Dielectric Strength is the voltage gradient at which dielectric failure of the insulating material occurs under specific condition. It was measured herein according to ASTM D 149-97A and reported in kV/mm.

Voltage Endurance is the time that an insulating material can withstand a prolonged alternating voltage stress under the action of surface corona. Herein it was measured as the median time to failure of resistance to prolonged alternating voltage stress under corona conditions in accordance with ASTM D 2275-01 and reported in hours at 12 kV/mm, 360 hz.

EXAMPLES

Example 1

A laminate structure was made from a mica paper layer and a woven glass cloth support layer. The mica paper layer was 0.15 mm thick and contained of 95 weight percent calcined mica flake (muscovite type available from the Electrical Samica Flake Co., Rutland, Vt.) and 2 weight percent poly(metaphenylene isophthalamide) (MPD-I) fibrids made in a manner generally described in U.S. Pat. No. 3,756,908 and 3 weight percent of floc that was 0.22 tex linear density and 0.64 cm length Nomex® fiber, available from the DuPont Co., Wilmington, Del. Therefore the percentage supporting material in the mica paper layer was 60 wt % floc and 40 wt % fibrids.

The woven glass cloth-based support layer contained 50 μm glass thread. It was attached to the mica paper layer by epoxy adhesive (approximately 9 $g/m^2$) placed between the mica paper layer and the woven glass cloth. This assembly was then calendered between nipped calender rolls heated to 150° C. and operating at a nip pressure of 2500 N/cm to cure the adhesive and produce a laminate structure having a mica paper layer, adhesive, and a woven glass cloth support layer. The resulting laminate structure had a thickness of 0.16 mm and a basis weight of 191 $g/m^2$, was well bonded, and showed excellent tensile strength, flexibility and good Gurley porosity. Data for this laminate structure is shown in Tables 1 & 2.

Comparative Example A

Comparative Example A was made in a similar manner to Example 1 except it did not contain any polymeric floc but instead contained 5 weight percent poly(metaphenylene isophthalamide) fibrids and 95 weight percent calcined mica flake (muscovite type available from the Electrical Samica Flake Co., Rutland, Vt. The resulting laminate structure was well bonded and had a thickness of 0.151 mm and a basis weight of 188 $g/m^2$. Data for this laminate structure is shown in Tables 1 & 2.

As shown in Table 2, the dielectric strength of the laminate structure was similar to the laminate structure of Example 1. However the Gurley Porosity of the laminate structure of Comparative Example A was dramatically higher than the laminate structure of Example 1, indicating a much less porous structure. Therefore the absence of floc in the supporting material of the mica paper layer has an unexpected effect on the Gurley porosity of the final laminate structure; which is believed to be the result of the extreme densification of thin calcined mica flakes and filmy fibrids under hot temperature calendering.

Comparative Example B

Comparative Example A was repeated, but with uncalcined mica flake (muscovite type available from the SWECO Inc., South Korea) used in the mica paper layer instead of calcined mica. The resulting total laminate structure had a thickness of 0.18 mm and a basis weight of 183 $g/m^2$. Data for this laminate structure is shown in Tables 1 & 2.

As shown in Table 2, the use of uncalcined mica provided a highly porous substrate as indicated by a low Gurley Porosity; however, the dielectric strength was also undesirably reduced.

Comparative Example C

Comparative Example C was made in a similar manner to Example A except the mica paper layer contained only 100 weight percent uncalcined mica flake (muscovite type available from the SWECO Inc., South Korea). The resulting total laminate structure had a thickness of 0.20 mm and a basis weight of 182 g/m². Data for this laminate structure is shown in Tables 1 & 2.

As shown in Table 2, the use of uncalcined mica and no fibrids provided a suitably porous substrate as indicated by a low Gurley Porosity; however, the dielectric strength was even more reduced over Comparative Example B.

Example 2

A multilayer laminate structure was made from three separate layers, wherein a woven glass support layer was position between and attached to two mica paper layers. The mica paper layers were as in Example 1 but with a lower basis weight of 90 g/m².

The woven glass cloth based support layer contained 50 μm glass thread. It was attached to each of the two mica paper layers with epoxy adhesive (approximately 9 g/m²), and then the assembly was calendered between nipped calender rolls heated to 150° C. and operating at a nip pressure of 2500 N/cm to produce a laminate structure having a mica paper layer, adhesive, a woven glass cloth support layer, adhesive, and another mica paper layer. A total laminate structure thickness was 0.17 mm. The resulting laminate structure had a thickness of 0.17 mm and a basis weight of 201 g/m²,was well bonded, and showed excellent tensile strength, flexibility and good Gurley porosity. Data for this laminate structure is shown in Tables 1 & 2. Even with an additional layer the 3-layer laminate structure had a good combination of dielectric strength and Gurley porosity.

Example 3

The multilayer laminate structures of Examples 1 and 2 are slit into rolls of 15 mm wide tape. The tape is then used to spirally wrap a metal conductor having a cross sectional dimension of 150 mm by 75 mm. The tape is wrapped in half wrap (50% overwrap) until the conductor is adequately insulated. Some of the wrapped conductors are used in a motor as is, while others are impregnated with an expoxy resin prior to use in the motor. The tapes provide good electrical insulation to the conductor.

TABLE 1

| Example | Composition of mica layer(s) | Overall Laminate Structure Composition | | | |
|---|---|---|---|---|---|
| | | Mica (wt %) | Aramid (wt %) | Glass (wt %) | Adhesive (wt %) |
| 1 | 95% calcined mica, 3% floc, 2% fibrid | 75.2 | 5.9 | 13.5 | 5.1 |
| 2 | 95% calcined mica, 3% floc, 2% fibrid | 74.7 | 4.7 | 13.8 | 6.8 |
| A | 95% calcined mica, 5% fibrid | 76.4 | 6.6 | 12.3 | 4.7 |
| B | 95% uncalcined mica, 5% fibrid | 75.7 | 4.7 | 13.2 | 7.4 |
| C | 100% uncalcined mica | 80.9 | 0.0 | 13.4 | 5.7 |

TABLE 2

| Properties | Example | | | | |
|---|---|---|---|---|---|
| | 1 | 2 | A | B | C |
| Thickness (mm) | 0.16 | 0.17 | 0.15 | 0.18 | 0.20 |
| Basis Weight (g/m²) | 191 | 201 | 188 | 183 | 182 |
| Tensile Strength (N/cm) | 147 | 141 | 142 | 171 | 113 |
| Gurley Porosity (seconds) | 364 | 316 | >1,000 | 130 | 286 |
| Dielectric Strength (kV/mm) | 23.5 | 21.8 | 20.9 | 13.6 | 9.5 |
| Voltage Endurance (hours) | >400 | >400 | 356 | 79.7 | 46.1 |
| Stiffness (N/m) | 33 | 30 | 46 | 51 | 48 |

What is claimed is:

1. A laminate structure suitable for use as electrical insulation, comprising:
    a) a first paper layer comprising 90 to 99 weight percent uniformly distributed calcined mica and 1 to 10 weight percent supporting material, a majority by weight of the supporting material being in the form of an aramid floc, the supporting material further comprising a binder that is an aramid fibrid; and
    b) a support layer comprising unidirectional filaments or unidirectional yarns or woven yarns, the support layer having a first and second face;
    wherein the first face of the support layer is directly bound to a face of the first paper layer;
    the laminate structure having a dielectric strength of 15 kV/mm or greater, a Gurley porosity of 400 seconds or less, and a total mica content of 60 weight percent or greater,
    wherein the floc in the first paper layer is present in an amount of 60 weight percent or greater, based on the total amount of the supporting material in the first paper layer.

2. The laminate structure of claim 1 wherein the floc in the first paper layer is present in an amount of 80 weight percent or greater, based on the total amount of the supporting material in the first paper layer.

3. The laminate structure of claim 1 wherein the aramid is poly(metaphenylene isophthalamide).

4. The laminate structure of claim 1 further including an adhesive on the first or second face of the support layer.

5. The laminate structure of claim 1 wherein the filaments or fibers of the support layer comprise glass filaments or fibers.

6. The laminate structure of claim 1 in the form of a tape having a width of 0.635 to 5.1 centimeters (0.25 to 2 inches).

7. The laminate structure of claim 1 further comprising an impregnating resin, varnish, or mixture thereof.

8. A laminate structure suitable for use as electrical insulation, comprising:
    a) a first paper layer comprising 90 to 99 weight percent uniformly distributed calcined mica and 1 to 10 weight percent supporting material, a majority by weight of the supporting material being in the form of an aramid floc, the supporting material further comprising a binder that is an aramid fibrid;
    b) a support layer comprising unidirectional or woven filament yarns, the support layer having a first and second face; and
    c) a second paper layer comprising 90 to 99 weight percent uniformly distributed calcined mica and 1 to 10 weight percent supporting material, a majority by weight of the supporting material being in the form of an aramid floc, the supporting material further comprising a binder that is an aramid fibrid;

wherein the first face of the support layer is directly bound to a face of the first paper layer and the second face of the support layer is directly bound to a face of the second paper layer; and the laminate structure having a total mica content of 60 weight percent or greater, wherein the floc in both the first and the second paper layer is present in an amount of 60 weight percent or greater, based on the total amount of the supporting material in the respective paper layer.

9. The laminate structure of claim 8 having a dielectric strength of 15 kV/mm or greater and a Gurley porosity of 400 seconds or less.

10. The laminate structure of claim 9 wherein the floc in both the first and the second paper layer is present in an amount of 80 weight percent or greater, based on the total amount of the supporting material in the respective paper layer.

11. The laminate structure of claim 8 further including an adhesive on the first or second face of the support layer.

12. The laminate structure of claim 8 wherein the filaments or fibers of the support layer comprise glass filaments or fibers.

13. The laminate structure of claim 8 in the form of a tape having a width of 0.635 to 5.1 centimeters (0.25 to 2 inches).

14. The laminate structure of claim 8 further comprising an impregnating resin, varnish, or mixture thereof.

* * * * *